(12) United States Patent
Cha et al.

(10) Patent No.: US 10,263,655 B2
(45) Date of Patent: Apr. 16, 2019

(54) METHOD OF PROCESSING PROVISIONING PROFILE AND ELECTRONIC DEVICE FOR SUPPORTING THE SAME

(71) Applicant: Samsung Electronics Co., Ltd., Gyeonggi-do (KR)

(72) Inventors: Soon Hyun Cha, Gyeonggi-do (KR); Sang Soo Lee, Gyeonggi-do (KR); Duc Key Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/803,955

(22) Filed: Jul. 20, 2015

(65) Prior Publication Data
US 2016/0020803 A1 Jan. 21, 2016

(30) Foreign Application Priority Data
Jul. 19, 2014 (KR) .................. 10-2014-0091388

(51) Int. Cl.
*H04W 4/00* (2009.01)
*H04B 1/3816* (2015.01)
(Continued)

(52) U.S. Cl.
CPC ............ *H04B 1/3816* (2013.01); *H04W 8/18* (2013.01); *H04W 8/205* (2013.01); *H04W 76/10* (2018.02)

(58) Field of Classification Search
CPC ........ H04M 1/00; H04B 1/3816; H04W 8/18; H04W 8/205; H04W 76/02; H04W 12/06; H04W 60/00; H04W 60/04; H04W 8/26; H04W 36/14; H04W 48/16; H04W 48/18; H04W 88/06
(Continued)

(56) References Cited

U.S. PATENT DOCUMENTS 8,160,494 B2 * 4/2012 Tysowski ................ H04L 51/14
370/503
8,843,124 B2 * 9/2014 Fan ..................... H04M 3/42178
455/419
(Continued)

FOREIGN PATENT DOCUMENTS

CN 103518401 1/2014
CN 103533634 1/2014
(Continued)

OTHER PUBLICATIONS

European Search Report dated Dec. 4, 2015 issued in counterpart application No. 15177389.2-1854, 11 pages.
(Continued)

*Primary Examiner* — Huy C Ho
(74) *Attorney, Agent, or Firm* — The Farrell Law Firm, P.C.

(57) ABSTRACT

An electronic device is provided. The electronic device includes a subscriber identification module (SIM) configured to store at least one provisioning profile, and a processor configured to control operation of the SIM, and if execution of provisioning through a first network with a server device which provides a profile fails, the processor is further configured to collect information for connecting to the server device and to perform provisioning through a second network based on the collected information.

22 Claims, 10 Drawing Sheets

(51) Int. Cl.
*H04W 76/10* (2018.01)
*H04W 8/20* (2009.01)
*H04W 8/18* (2009.01)
*H04W 36/00* (2009.01)
*H04M 1/00* (2006.01)
*H04B 1/38* (2015.01)

(58) Field of Classification Search
USPC ...................................................... 455/553.1
See application file for complete search history.

(56) References Cited

U.S. PATENT DOCUMENTS

| | | | |
|---|---|---|---|
| 8,930,238 B2 | 1/2015 | Coffman et al. | |
| 9,226,225 B2* | 12/2015 | Elliott | H04W 48/16 |
| 9,642,051 B2 | 5/2017 | Lund et al. | |
| 9,907,001 B2 | 2/2018 | Jin et al. | |
| 2005/0070321 A1 | 3/2005 | Weigele | |
| 2008/0153547 A1 | 6/2008 | Weigele | |
| 2009/0216606 A1* | 8/2009 | Coffman | G06Q 30/02 |
| | | | 705/14.1 |
| 2010/0120410 A1 | 5/2010 | Fan et al. | |
| 2011/0207503 A1* | 8/2011 | Ruperto | H04W 48/18 |
| | | | 455/552.1 |
| 2011/0244921 A1 | 10/2011 | Weigele | |
| 2011/0306318 A1 | 12/2011 | Rodgers et al. | |
| 2012/0108204 A1 | 5/2012 | Schell et al. | |
| 2013/0344864 A1* | 12/2013 | Park | H04W 8/18 |
| | | | 455/432.3 |
| 2014/0004827 A1 | 1/2014 | O'Leary | |
| 2014/0045460 A1 | 2/2014 | Park et al. | |
| 2014/0233374 A1 | 8/2014 | Elliott | |
| 2014/0342715 A1 | 11/2014 | Gu et al. | |
| 2015/0172968 A1* | 6/2015 | Lund | H04W 36/0066 |
| | | | 455/411 |
| 2015/0186705 A1* | 7/2015 | Magi | G06K 9/0002 |
| | | | 382/125 |
| 2015/0237551 A1 | 8/2015 | Jin et al. | |
| 2015/0264602 A1* | 9/2015 | Hageltorn | H04W 36/0016 |
| | | | 455/436 |
| 2015/0312699 A1 | 10/2015 | Rodgers et al. | |
| 2015/0349825 A1 | 12/2015 | Lee et al. | |
| 2017/0295158 A1* | 10/2017 | Chastain | H04L 63/08 |

FOREIGN PATENT DOCUMENTS

| | | |
|---|---|---|
| CN | 103702377 | 4/2014 |
| CN | 105101319 | 11/2015 |
| EP | 1 503 602 | 2/2005 |
| KR | 1020140075603 | 6/2014 |
| WO | WO 2012/058099 | 5/2012 |
| WO | WO 2013/154577 | 10/2013 |
| WO | WO 2013/179092 | 12/2013 |
| WO | WO 2014/101094 | 7/2014 |

OTHER PUBLICATIONS

European Search Report dated Jan. 2, 2018 issued in counterpart application No. 15177389.2-1854, 5 pages.
Chinese Office Action dated Feb. 23, 2018 issued in counterpart application No. 201510423272.7, 26 pages.
Chinese Office Action dated Aug. 17, 2018 issued in counterpart application No. 201510423272.7, 16 pages.

* cited by examiner

METHOD OF PROCESSING PROVISIONING PROFILE AND ELECTRONIC DEVICE FOR SUPPORTING THE SAME

PRIORITY

This application claims priority under 35 U.S.C. §119(a) to a Korean Patent Application filed on Jul. 19, 2014 in the Korean Intellectual Property Office and assigned serial number 10-2014-0091388, the entire disclosure of which is incorporated herein by reference.

BACKGROUND

1. Field of the Disclosure

The present disclosure relates to an operation of a subscriber module (SIM) of an electronic device, and more particularly, to a method of processing a provisioning profile to mount a provisioning profile on a SIM, to download and process a profile associated with operating a communication service of a certain mobile network operator (MNO), to establish a communication channel to be suitable for a network environment of an electronic device, and to receive the profile, and an electronic device for supporting the same.

2. Description of the Related Art

In general, conventional electronic devices support a communication function. The electronic devices use a SIM to support the communication function. After the SIM is mounted on a certain region of the electronic devices, these devices are authenticated by an MNO to operate.

The above-mentioned SIM is manufactured by a SIM manufacturer and is then delivered to an electronic device manufacturer. The electronic device manufacturer mounts the delivered SIM onto an electronic device and sells the electronic device to an MNO. When a user purchases the electronic device, the MNO mounts a profile associated with operating communication service functions of the electronic device onto the SIM and sells the electronic device to the corresponding user.

According to the above-mentioned electronic device distribution structure, a user may separately obtain an electronic device or may obtain an electronic device irrespective of an MNO (e.g., purchase it in the open market). In this case, because it is impossible to mount a profile associated with a specific MNO on the electronic device, there is a problem in that it is impossible for the user to use a communication service of the electronic device.

SUMMARY

The present disclosure has been made to address at least the above-mentioned problems and/or disadvantages and to provide at least the advantages described below.

Accordingly, an aspect of the present disclosure is to provide a method of processing a provisioning profile to mount a provisioning profile on a SIM to download and process a profile associated with operating a communication service of a specific MNO, to establish a communication channel to be suitable for a network environment of an electronic device, and to receive the profile, and an electronic device for supporting the same.

In accordance with an aspect of the present disclosure, an electronic device is provided. The electronic device includes a SIM configured to store at least one provisioning profile, and a processor configured to control operation of the SIM, and if execution of provisioning through a first network with a server device which provides a profile fails, the processor is further configured to collect information for connecting to the server device and to perform provisioning through a second network based on the collected information.

In accordance with another aspect of the present disclosure, a method of processing a provisioning profile in an electronic device is provided. The method includes attempting to perform provisioning through a first network with a server device which provides a profile, using at least one provisioning profile stored in a SIM, if provisioning through the first network fails, collecting information associated with connecting to the server device, and performing provisioning through a second network with the server device based on the information.

In accordance with another aspect of the present disclosure, a chipset for processing a provisioning profile in an electronic device is provided. The chipset is configured to attempt to perform provisioning through a first network with a server device which provides a profile, using at least one provisioning profile stored in a SIM, if provisioning through the first network fails, collect information associated with connecting to the server device, and perform provisioning through a second network with the server device based on the information.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
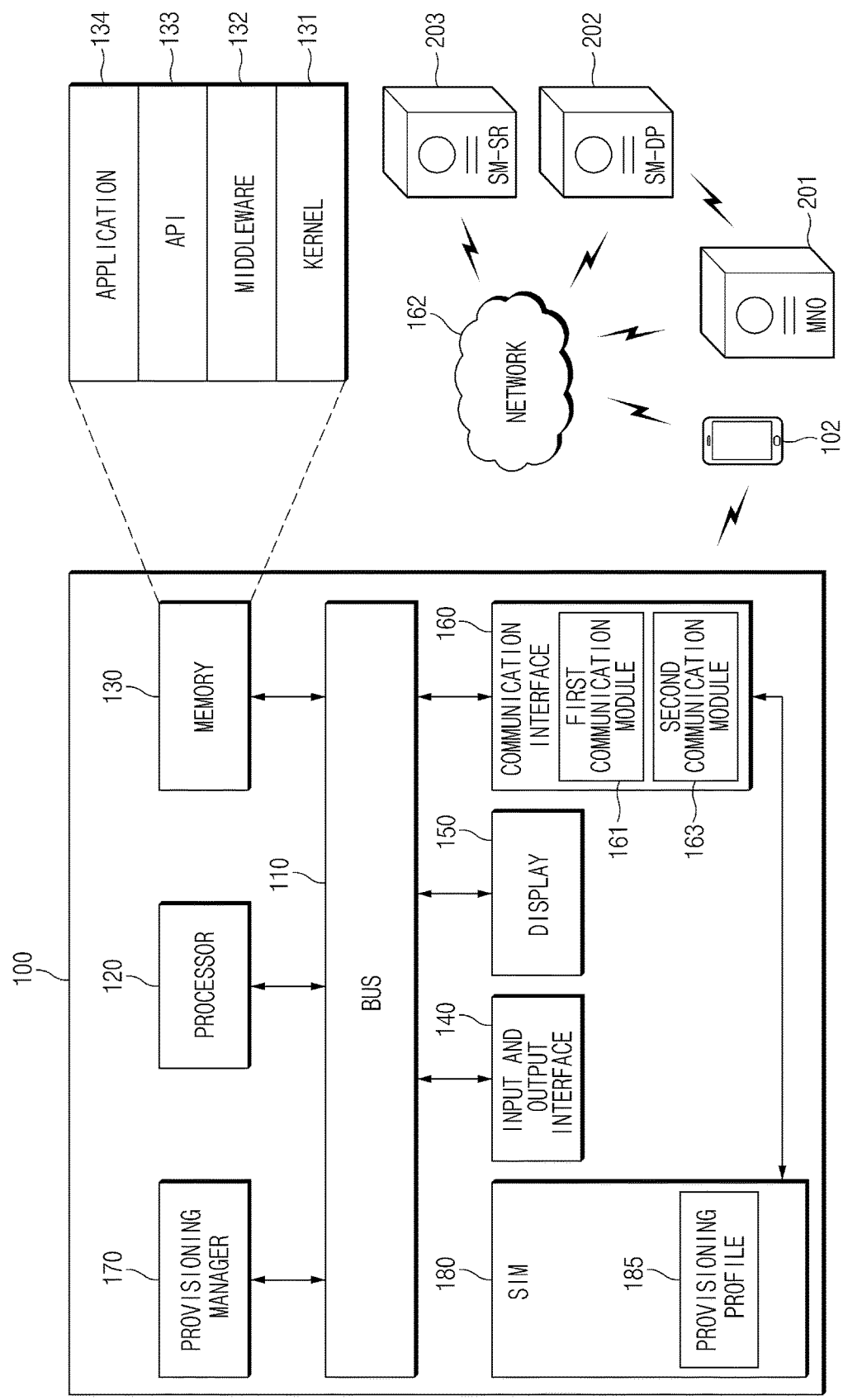
FIG. 1 is a block diagram of an electronic device operation environment associated with processing a profile according to a network state according to an embodiment of the present disclosure.

Hereinafter, the present disclosure is described with reference to the accompanying drawings. Various modifications are possible in various embodiments of the present disclosure and embodiments illustrated in the accompanying drawings are related detailed descriptions are listed. However, the present disclosure is not intended to be limited to the embodiments, and it is understood that all modifications and/or, equivalents and substitutes are included within the scope and spirit of the present disclosure. With respect to the descriptions of the accompanying drawings, like reference numerals refer to like elements.

In the present disclosure, the terms "have," "may have," "include," "comprise," "may include," and "may comprise" indicate the existence of corresponding features (e.g., elements such as numeric values, functions, operations, or components) but do not exclude the presence of additional features.

In the present disclosure, the expressions "A or B," "at least one of A and/or B," or "one or more of A and/or B," and the like used herein may include any and all combinations of one or more of the associated listed items. For example, the expressions "A or B," "at least one of A and B," or "at least one of A or B" may refer to (1) where at least one A is included, (2) where at least one B is included, or (3) where both of at least one A and at least one B are included.

The expressions such as "1st," "2nd," "first," or "second," and the like used in an embodiment of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope and spirit of the present disclosure.

It will be understood that when an element (e.g., a first element) is referred to as being "operatively or communicatively coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

Depending on the situation, the expression "configured to" used herein may be used as, for example, the expression "suitable for," "having the capacity to," "designed to," "adapted to," "made to," or "capable of." The term "configured to" does not mean only "specifically designed to" with regard to hardware. Instead, the expression "a device configured to" may mean that the device is "capable of" operating together with another device or other components. For example, a "processor configured to perform A, B, and C" may mean a general-purpose processor (e.g., a central processing unit (CPU) or an application processor) which may perform corresponding operations by executing one or more software programs which stores a dedicated processor (e.g., an embedded processor) for performing a corresponding operation.

Terms used in the present disclosure are used to describe certain embodiments of the present disclosure and are not intended to limit the scope of the present disclosure. The terms of a singular form may include plural forms unless otherwise indicated. Unless otherwise defined herein, all the terms used herein, which include technical or scientific terms, may have the same meanings that are generally understood by a person skilled in the art. It will be further understood that terms, which are defined in a dictionary and commonly used, should also be interpreted as is customary in the relevant related art and not in an idealized or overly formal manner unless expressly so defined herein in an embodiment of the present disclosure. In some cases, even if terms are defined in the specification, they may not be interpreted to exclude an embodiment of the present disclosure.

Electronic devices according to an embodiment of the present disclosure may include at least one of, for example, smart phones, tablet personal computers (PCs), mobile phones, video telephones, electronic book readers, desktop PCs, laptop PCs, netbook computers, workstations, servers, digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

According to an embodiment of the present disclosure, the electronic devices may be smart home appliances. The smart home appliances may include at least one of, for example, televisions (TVs), digital versatile disk (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

According to an embodiment of the present disclosure, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), point of sale (POS) devices, or the internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. The electronic devices according to an embodiment of the present disclosure may be flexible electronic devices. Also, electronic devices according to an embodiment of the present disclosure are not limited to the above-mentioned devices, and may include new electronic devices according to technology development Hereinafter, electronic devices according to an embodiment of the present disclosure will be described with reference to the accompanying drawings. The term "user" used herein may refer to a person who uses an electronic device or a device (e.g., an artificial electronic device) that uses an electronic device.

FIG. 1 is a block diagram of an electronic device operation environment associated with processing a profile according to a network state according to an embodiment of the present disclosure.

Referring to FIG. 1, an electronic device operation environment according to an embodiment of the present disclosure includes an electronic device 100, an external electronic device 102, a network 162, a mobile network operator (MNO) device 201, a subscription manager-data preparation (SM-DP) device 202, and an SM-secure routing (SM-SR) device 203. According to an embodiment of the present disclosure, the MNO device 201 and the SM-DP device 202 may be integrated as one device. Alternatively, the MNO device 201, the SM-DP device 202, the SM-SR device 203 may be integrated as one device. Alternatively, the SM-DP device 202 and the SM-SR device 203 may be integrated as one device. When the respective configurations are integrated as one device, functions of respective devices which are described below may be provided from one integrated device.

In the electronic device operation environment of this configuration, the electronic device 100 may attempt to connect to an MNO network provided from the MNO device 201 based on a provisioning profile 185 (e.g. initial user profile) which is stored in a subscriber identification module (SIM), an embedded SIM (eSIM), an embedded universal integrated circuit card (eUICC), or an embedded secure element (eSE), and the like, which are mounted as an embedded item. In this regard, the electronic device 100 may determine a connectable communication method to install a profile (including information, for example, a device identifier or a SIM identifier, subscription authentication information, a key necessary for connecting to a network, subscriber identification information (e.g., international mobile subscriber identity (IMSI)), and the like, which are necessary for using a communication service based on a network provided from an MNO) according to various network states, and may operate the provisioning profile 185 according to the determined communication method. For example, the electronic device 100 may be in a network state where there is no MNO network corresponding to the provisioning profile 185 in a current position, a network state where it is impossible to connect to an MNO network using a specific provisioning profile 185 among a plurality of provisioning profiles, a network state where there is an error of the specific provisioning profile 185, and the like. The electronic device 100 may install a profile by selecting the optimum provisioning profile 185 and selecting the optimum communication method in the above-mentioned various network states. The provisioning profile 185 may include information necessary for receiving a profile. For example, the provisioning profile 185 may include a profile type, information which may connect to an MNO network for providing a provisioning service associated with installing a profile or an MNO network associated with installing a profile, a billing method, and the like.

In the above-mentioned electronic device operation environment, the network 162 provides support to transmit and receive signals between the electronic device 100, the MNO device 201, the SM-DP device 202, and the SM-SR device 203. For example, the network 162 may be a network which is established by a specific MNO in association with supporting a communication service. For example, the network 162 may be a network (e.g., a cellular network) established by an MNO such as SKT, LGU+, KT, Verizon, or Orange.

According to an embodiment of the present disclosure, the network 162 may include an internet protocol (IP) network which may transmit signals between the electronic device 100, the external electronic device 102, the MNO device 201, the SM-DP device 202, and the SM-SR device 203. According to an embodiment of the present disclosure, the network 162 may provide a data communication channel (e.g., an IP network) between the electronic device 100 and the SM-SR device 203 associated with receiving a profile of the electronic device 100.

According to an embodiment of the present disclosure, the network 162 may include a provisioning network. The provisioning network may be a network through which the electronic device 100, which mounts the SIM 180 which stores the provisioning profile 185, may connect to the SM-SR device 203 using the provisioning profile 185. The provisioning network may establish a communication channel between, for example, the SM-SR device 203 and the electronic device 100 and may transmit information about installing a profile to the electronic device 100.

The external electronic device 102 may be a device having a SIM, which is previously registered in a specific MNO device 201, in which a profile is installed. The external electronic device 102 may connect to an MNO network associated with the specific MNO device 201. The external electronic device 102 may provide support to transmit information about receiving a profile of the electronic device 100 from the MNO device 201 according to a request of the electronic device 100. The external electronic device 102 may include a communication module which may communicate with a specific MNO network and a communication module which may communicate with the electronic device 100.

The MNO device 201 may include a communication module which may establish a communication channel with a first network (e.g., a cellular network), an operator server device which connects with the cellular network, and a communication module which may establish a communication channel with a second network (e.g., an IP network). The MNO device 201 may support registration (e.g. processing of subscription of users who want to subscribe to a communication service and support for installing a profile according to the subscription) associated with operating a communication service through an IP network. The MNO device 201 may control various electronic devices associated with supporting services of the users who subscribe to the communication service.

The MNO device 201 may provide a communication channel which may connect through at least one of the cellular network or the IP network. The MNO device 201 may provide, for example, an access channel of the electronic device 100 using the provisioning profile 185 through the IP network.

The SM-DP device 202 may generate a profile associated with operating a communication service of the electronic device 100 based on information (e.g., an eUICC identifier (EID), an integrated circuit card ID (ICCID), a spatial reference system ID (SRID), and the like) associated with the SIM 180 of the specific electronic device 100, which is provided from the MNO device 201. The profile generated by the SM-DP device 202 may be encrypted to provide security. The SM-DP device 202 may transmit a request associated with transmission of the generated profile to the SM-SR device 203. The SM-DP device 202 may transmit the profile to the electronic device 100 through the SM-SR device 203.

The SM-SR device 203 may establish a channel associated with transmitting a profile with the electronic device 100 in response to the request of the SM-DP device 202.

According to an embodiment of the present disclosure, the SM-SR device 203 may provide the profile through the provisioning network or may transmit the profile to the electronic device 100 based on the IP network. The SM-SR device 203 may have unique server identification information. The server identification information associated with the SM-SR device 203 may be generated or operated by a SIM manufacturer or may be operated by an electronic device manufacturer.

The electronic device 100 may search for whether there is an MNO network associated with the provisioning profile 185, which is stored in the SIM 180, using a specific communication module (e.g., a first communication module and a cellular module). When there is no MNO network associated with the provisioning profile 185, the electronic device 100 may extract information necessary for installing a profile from the provisioning profile 185. The electronic device 100 may transmit the extracted information to the MNO device 201 using a second communication module. When there is a plurality of provisioning profiles 185, the electronic device 100 may search for peripheral MNO networks which may be registered using at least one of the plurality of provisioning profiles 185. The electronic device 100 may select the MNO device 201 which supports a communication network of a specific reference value or greater or the relatively best communication network among the plurality of MNO networks.

Referring to FIG. 1, the electronic device 100 includes a bus 110, a processor 120, a memory 130, an input and output interface 140, a display 150, a communication interface 160, a provisioning manager 170, and the SIM 180. According to an embodiment of the present disclosure, the provisioning manager 170 may be implemented with a device including the processor 120 and the communication interface 160.

The bus 110 is a circuit which connects the above-mentioned components to each other and transmits communication (e.g., a control message, an input event, data, and the like) between the above-mentioned components. For example, the bus 110 may transmit an input signal input from the input and output interface 140 to at least one of the processor 120 or the provisioning manager 170. For example, the bus 110 may transmit the provisioning profile 185 of the electronic device 100 to the provisioning manager 170 or the processor 120.

For example, the processor 120 may receive instructions from the above-mentioned other components (e.g., the memory 130, the input and output interface 140, the display 150, the communication interface 160, or the provisioning manager 170, and the like) through the bus 110. The processor 120 decodes the received instructions and performs a calculation or processes data according to the decoded instructions. The processor 120 may be implemented with a device including the provisioning manager 170 or may be implemented with a device independent from the provisioning manager 170. The processor 120 may be implemented with a device which communicates with the provisioning manager 170 based on the bus 110 or directly. Alternatively, the processor 120 may be a configuration of the provisioning manager 170 (or a configuration included in the provisioning manager 170). The processor 120 may process signals associated with installing a profile of the SIM 180 according to an embodiment of the present disclosure. For example, the processor 120 may process signals associated with operating the at least one provisioning profile 185.

The memory 130 stores instructions or data which are received from the processor 120 or other components (e.g., the input and output interface 140, the display 150, the communication interface 160, or the provisioning manager 170, and the like) or are generated by the processor 120 or the other components. The memory 130 may include programming modules, such as a kernel 131, middleware 132, an application programming interface (API) 133, or an application 134, and the like. The above-mentioned respective programming modules may be configured with software, firmware, hardware, or at least two or more combinations thereof.

The kernel 131 controls or manages system resources (e.g., the bus 110, the processor 120, or the memory 130, and the like) used to execute an operation or function implemented in the other programming modules, for example, the middleware 132, the API 133, or the application 134. Also, the kernel 131 may provide an interface which may be controlled or managed in the middleware 132, the API 133, or the application 134 associated with processing a network search function of an MNO associated with the specific provisioning profile 185 using the first communication module or processing a provisioning execution function using the second communication module.

The middleware 132 plays a role as a go-between such that the API 133 or the application 134 communicates with the kernel 131 and transmits and receives data. Also, the middleware 132 performs control (e.g., scheduling or load balancing) with respect to work requests using a method of assigning priority which may use system resources (e.g., the bus 110, the processor 120, or the memory 130, and the like) of the electronic device 100 to, for example, at least one of the application 134, associated with the work requests received from the application 134.

The API 133 is an interface in which the application 134 controls a function provided from the kernel 131 or the middleware 132. For example, the API 133 may include at least one interface or function (e.g., instruction) for file control, window control, image processing, or text control, and the like.

The applications 134 may include at least one application associated with operating the electronic device 100. For example, the application 134 may include applications associated with a camera function, a music play function, a video play function, a communication function, a recording function, a game function, a health care function, and the like. According to an embodiment of the present disclosure, the application 134 may include a function associated with operating the provisioning profile 185. For example, the application 134 may include a routine (e.g., a data assembly including at least one instruction, an instruction set, a program configured with at least one instruction, a template, a syntax, and the like) of determining the at least one provisioning profile 185 which is stored in the SIM 180, a routine of searching for an available MNO network when there are the plurality of provisioning profile 185, a routine of requesting installation of a profile through the found MNO network, a routine of controlling provisioning execution based on the second communication module when it is impossible to use a specific MNO network.

The input and output interface 140 transmits instructions or data input from the user through an input and output device (e.g., a key button, a touch key, a sensor, a keyboard, or a touch screen) to, for example, the processor 120, the memory 130, the communication interface 160, or the provisioning manager 170 through the bus 110. According to an embodiment of the present disclosure, the input and output interface 140 may perform a function associated with processing audio. In this regard, the input and output interface 140 may include at least one of a speaker or a microphone as a single entity or a plurality of entities. According to an embodiment of the present disclosure, the input and output interface 140 may output at least one of a vibration pattern, audio data, or a lamp "ON/OFF" pattern which corresponds to guide information about a result of searching for a specific MNO network, guide information about whether there is a specific MNO network, guide information about whether there is a provisioning network, guide information about an error of a provisioning profile, and the like.

The display 150 displays a variety of information (e.g., multimedia data, or text data, and the like). For example, the display 150 may output a lock screen, a waiting screen, and the like. According to an embodiment of the present disclosure, the display 150 may output notification about whether the provisioning profile 185 associated with a specific MNO network is stored in the SIM 180. The display 150 may provide information about MNO networks which may connect to the plurality of provisioning profiles 185 according to a specific position or settings, and the like of the electronic device 100. The display 150 may provide information about an MNO network having the best communication environment among a plurality of MNO networks.

The communication interface 160 may include the first communication module which may connect to an MNO network (e.g., a network which is associated with the MNO device 201 or operated by the MNO device 201) and the second communication module which may establish a communication channel with other electronic devices rather than the MNO network. According to an embodiment of the present disclosure, the communication interface 160 may directly connect to the SIM 180, and may transmit the provisioning file 185 or information about operating the provisioning file 185 according to control of the provisioning manager 170.

The first communication module may perform communication between the electronic device 100 and an external device (e.g., at least one of the MNO device 201, the SM-DP device 202, or the SM-SR device 203). For example, the first communication module may connect to the network 162 (e.g., a network which is connected to the MNO device 201 or is operated by the MNO device 201) through wireless communication or wire communication and may communicate with the external device. The wireless communication may include, for example, cellular communication (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like).

The second communication module may include at least one of a communication module (wireless-fidelity (Wi-Fi), Bluetooth (BT), and near field communication (NFC)) which may establish a local-area wireless communication channel and a communication module which may establish a wired communication channel with another electronic device. The wired communication may include at least one of, for example, a universal serial bus (USB), a high definition multimedia interface (HDMI), a recommended standard 232 (RS-232), or a plain old telephone service (POTS).

According to an embodiment of the present disclosure, the communication interface 160 may scan at least one MNO network based on the at least one provisioning profile 185. The communication interface 160 may provide information (e.g., received strength of a radio signal, a transmission speed, and the like) about a communication environment of the corresponding MNO network in the process of scanning the MNO network. The communication interface 160 may receive a profile associated with the specific MNO device 201 and may transmit the received profile to the SIM 180.

For example, the SIM 180 may be inserted as an embedded type into the electronic device 100. Alternatively, the SIM 180 may be removably installed and may be inserted into a slot formed in the electronic device 100. The SIM 180 according to an embodiment of the present disclosure may store the at least one provisioning profile 185 associated with registering a specific MNO. For example, the SIM 185 may store at least one of the provisioning profile 185 of the SKT MNO, the provisioning profile 185 of the KT MNO, or the provisioning profile 185 of the Verizon MNO, and the like. The SIM 180 may download and install a profile necessary for using a communication service through the SM-SR device 203. The SIM 180 may connect to the provisioning manager 170 or the processor 120 through the communication interface 160.

The provisioning manager 170 performs control associated with operating the provisioning profile 185 of the electronic device 100 and downloading and installing a profile. In this regard, the provisioning manager 170 may control the communication interface 160 to search for an MNO network associated with the provisioning profile 185. The provisioning manager 170 may control the communication interface 160 to output the found result. If an MNO network is determined (e.g., is determined according to a selection of a user, connection history, or setting), the provisioning manager 170 may control execution of provisioning (e.g., an operation of storing subscriber related information in an MNO device) through the determined MNO network. In this regard, when an MNO is not searched for, when there is no provisioning network, or when an error occurs in a provisioning profile, the provisioning manager 170 may control provisioning processing through the external electronic device 102 or a public network (e.g., a Wi-Fi-based IP network).

Figure 2:
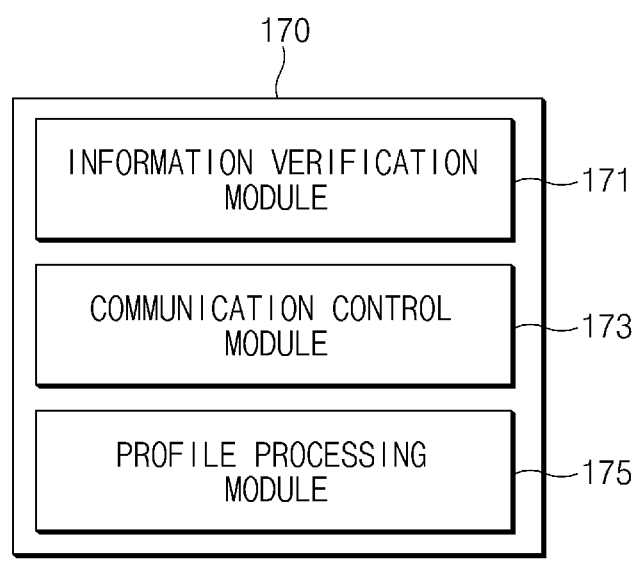
FIG. 2 is a block diagram of a provisioning manager according to an embodiment of the present disclosure.

FIG. 2 is a block diagram of a provisioning manager according to an embodiment of the present disclosure.

Referring to FIG. 2, a provisioning manager 170 includes an information verification module 171, a communication control module 173, and a profile processing module 175.

If a specific event occurs, the information verification module 171 may determine (or verify) whether a provisioning profile 185 of FIG. 1 exists in a SIM 180 of FIG. 1. For example, if a specific event occurs (e.g., if an electronic device 100 of FIG. 1 is changed from a turn-off state to a turn-on state or if provisioning associated with installing a profile is requested), the information verification module 171 may determine whether the provisioning profile 185 is stored in the SIM 180 through a communication interface 160 of FIG. 1. If the at least one provisioning profile 185 exists in the SIM 180, the information verification module 171 may display information about the provisioning profile 185 on a display 150 of FIG. 1. For example, the information verification module 171 may display the plurality of provisioning profiles 185 on the display 150. If the specific provisioning profile 185 is selected, the information verification module 171 may request the communication control module 173 to perform (or execute) provisioning based on the corresponding provisioning profile 185.

According to an embodiment of the present disclosure, the information verification module 171 may request the communication control module 173 to transmit communication environment information of MNO networks corresponding to the plurality of provisioning profiles 185. When the communication environment information associated with the plurality of MNO networks is received from the communication control module 173, the information verification module 171 may output the communication environment information to the display 150. In this regard, the information verification module 171 may output communication environment information of all MNO networks or may output communication environment information of MNO networks which have the best communication environment or a communication environment of a specific condition (e.g., a specific value or greater). If specific communication environment information is selected, the information verification module 171 may request the communication control module 173 to perform provisioning based on the corresponding provisioning profile 185. According to an embodiment of the present disclosure, if the provisioning performed based on the specific provisioning profile 185 fails, the information verification module 171 requests the communication control module 173 to perform provisioning through another provisioning profile 185. In this process, the information verification module 171 may successively select the provisioning profile 185 according to communication environments of an MNO network, and may request the communication control module 173 to perform provisioning based on the selected provisioning profile. For example, the information verification module 171 may request the communication control module 173 to perform provisioning from the provisioning profile 185 associated with an MNO network which has sufficient received strength of radio signals.

According to an embodiment of the present disclosure, the information verification module 171 may output at least one of information about the failure in searching for the MNO associated with the specific provisioning profile 185, information indicating whether there is the provisioning network, or information indicating whether an error occurs in the provisioning profile. The information verification module 171 may output guide information about a failure in provisioning based on the specific provisioning profile 185 and the first communication module (e.g., a communication module which may directly connect to an MNO associated with the provisioning profile 185) of the communication interface 160.

According to an embodiment of the present disclosure, the information verification module 171 may output information about the progress of provisioning through the second communication module. For example, when it is impossible to perform provisioning based on the first communication module, the information verification module 171 may output information for selecting another communication method (e.g., a provisioning progress method through the second communication module). The information verification module 171 may request connection with an external electronic device which may connect to a specific MNO network. Alternatively, the information verification module 171 may output information for requesting connection through an IP network of the MNO device 201 associated with the provisioning profile 185. When the electronic device 100 connects with an external electronic device based on the second communication module (e.g., wired connection and wireless connection), the information verification module 171 may output information indicating whether the external electronic device may connect to a specific MNO network or may connect to an IP network to which the MNO device 201 connects.

The communication control module 173 may perform provisioning based on the specific provisioning profile 185 according to the request of the information verification module 171. For example, the communication control module 173 may perform provisioning based on information included in the provisioning profile 185 and the first communication module. When the provisioning based on the first communication module fails, the communication control module 173 may collect server device related information (e.g., an address of SM-SR, SM-SR ID (SRID), and the like) stored in the provisioning profile 185 (or the SIM 180) or may request the SIM 180 to collect the server device related information. Herein, when the electronic device 100 does not connect to a network during a specific time, when connection is denied from a network, or when there is no network which may connect around the electronic device 100, and the like, the communication control module 173 may determine that the electronic device 100 may not connect to a server device (e.g., a device which provides a profile) through a first network (e.g., a cellular network).

The communication control module 173 may store the server device related information in a memory 130 of FIG. 1. The communication control module 173 may perform provisioning based on the second communication module using the server device related information stored in the memory 130. In this regard, if it is determined that the provisioning based on the first communication module fails or it is impossible to perform the provisioning based on the first communication module, the communication control module 173 may control the communication interface 160 to activate the second communication module. According to an embodiment of the present disclosure, the communication control module 173 may transmit information associated with network connection to the second communication module of the communication interface 160 to request the second communication module to connect to a second network. For example, requesting a Wi-Fi communication module to connect to a network, the communication control module 173 may transmit an IP address, a service set ID (SSID), an ID, a password, and the like of an access point (AP) together to the Wi-Fi communication module. According to an embodiment of the present disclosure, requesting a Bluetooth communication module to connect to a network, the communication control module 173 may transmit a media access control (MAC) address, information about history in which the electronic device 100 previously connected with an external electronic device, and the like to the Bluetooth communication module.

According to an embodiment of the present disclosure, the communication control module 173 may search for a peripheral electronic device which may establish a communication channel based on the second communication module, and may search for an external electronic device which may connect to an MNO network associated with the provisioning profile 185. In this regard, the communication control module 173 may transmit a determination request for whether the electronic device 100 may connect to a specific MNO network to external electronic devices, and may establish a communication channel based on the second communication module with an external electronic device which provides a response, in which the electronic device 100 may connect to the specific MNO network, among the external electronic devices. Receiving a response to a state where it is impossible to connect to the specific MNO network (e.g., when a profile associated with the corresponding MNO device 201 does not exist in the found external electronic device 102), the communication control module 173 may transmit the received response to the information verification module 171.

According to an embodiment of the present disclosure, the communication control module 173 may directly connect to a server device which may provide a profile through the server device related information stored in the memory 130 and the second communication module. Herein, the server device may include at least one of an SM-SR device 203, an MNO device 201, or an SM-DP device 202 of FIG. 1, which may generate and transmit a profile. The communication control module 173 may determine whether it is possible to connect to a peripheral IP network using the second communication module. When it is possible to connect to the peripheral IP network, the communication control module 173 may connect to the server device based on the server device related information.

When the profile processing module 175 connects to (or establishes a communication channel with) the server device using a communication interface 160 of FIG. 1, the server device, for example, the SM-DP device 202 may receive a profile through a channel provided from the SM-SR device 203. If network connection succeeds based on the communication interface 160 (e.g., the second communication module), the profile processing module 175 may transmit a request for establishing a session (e.g., a secure transport channel (e.g., an over-the-air (OTA) session) or a secure channel protocol 81 (SCP 81) https session) through an IP network to the SIM 180. If the SIM 180 establishes the session associated with receiving a profile with the server device, the profile processing module 175 may control the communication interface 160 to transmit the received profile to the SIM 180.

Figure 3:
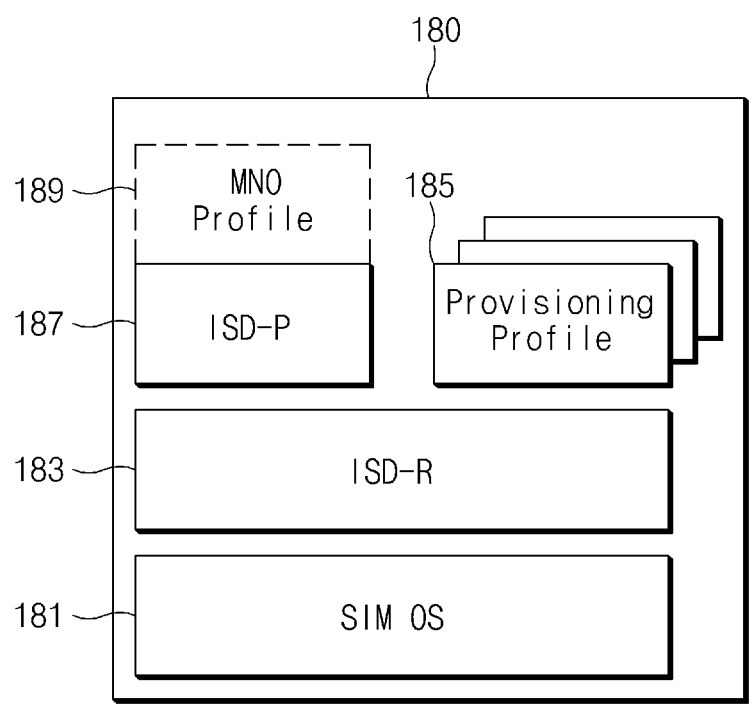
FIG. 3 is a block diagram of a SIM according to an embodiment of the present disclosure.

FIG. 3 is a block diagram illustrating a detailed configuration of a SIM according to an embodiment of the present disclosure.

Referring to FIG. 3, a SIM 180 includes a SIM operating system (OS) 181, an issuer security domain-root (ISD-R) 183, an ISD-profile (ISD-P) 187, at least one provisioning profile 185, and an MNO profile 189 (or a profile).

The SIM OS 181 may transmit, control, and process a signal associated with operating the SIM 180. For example, the SIM OS 181 may provide an interface or a library, and the like necessary for transmitting and receiving data of the ISD-R 183, generating the ISD-P 187, managing the provisioning profile 185, installing the MNO profile 189, and the like.

The ISD-R 183 may be disposed on the SIM OS 181, and may communicate with an external module, for example, a communication interface 160 of FIG. 1 based on the SIM OS 181. In this regard, the ISD-R 183 may provide security environments. For example, the ISD-R 183 may encrypt and decrypt data transmitted and received through the communication interface 160. According to an embodiment of the present disclosure, the ISD-R 183 may establish a session with a server device (e.g., an SM-DP device 202 associated with installing a profile or an SIM-SR device, and the like) through the communication interface 160. The ISD-R 183 may establish the session with the server device according to a request message (e.g., a short message service (SMS) message) for establishing the session is received from the server device. Alternatively, the ISD-R 183 may control the communication interface 160 (e.g., the second communication module) according to a request of a provisioning manager 170 of FIG. 1 and may request the server device to establish a session. If the session is established and a profile is then received, the ISD-R 183 may generate an ISD-P 187 associated with installing the corresponding profile. If a profile is received through the session, the ISD-R 183 may transmit the received profile to the ISD-P 187. When it is necessary to install a plurality of profiles, the ISD-R 183 may generate a plurality of ISD-Ps 187.

According to an embodiment of the present disclosure, the ISD-R 183 may provide information about the provisioning profile 185 in response to a request of the provisioning manager 170. For example, the ISD-R 183 may provide server device related information (e.g., an SRID or a server address, and the like) stored in the provisioning profile 185 or the SIM 180 to the provisioning manager 170. According to an embodiment of the present disclosure, if there is a plurality of provisioning profiles 185, the ISD-R 183 may provide the plurality of provisioning profiles 185 in response to a request of the provisioning manager 170.

The ISD-P 187 may install a profile according to control of the ISD-R 183. The ISD-P 187 may be generated whenever the specific MNO profile 189 is installed. If a request for deleting the MNO profile 189 is generated, the ISD-P 187 may be removed. The ISD-P 187 may have an activation state or a non-activation state in response to an operation state of the MNO profile.

The provisioning profile 185 may be a file used to perform provisioning associated with installing a profile. For example, the provisioning profile 185 may include information necessary for downloading and installing a profile which may use at least one MNO network. For example, the provisioning profile 185 may include an SRID or a server address of a server device (e.g., the SM-SR device 203) associated with the specific MNO device 201.

The MNO profile 189 may include information necessary for using a communication service through a specific MNO network. The MNO profile 189 may include subscription authentication information, international mobile subscriber identity (IMSI), policy information, billing information, and the like. The MNO profile 189 may be operated by the ISD-P 187. The MNO profile 189 may be activated or inactivated according to user settings or according to billing or a limit on MNOs.

The above-mentioned SIM 180 may include a single provisioning profile 185. When there is failure in a process of performing provisioning based on the first communication module, the SIM 180 may provide server device related information in associated with performing provisioning based on the second communication module. According to an embodiment of the present disclosure, the SIM 180 may include the plurality of provisioning profiles 185. When provisioning is performed based on the first communication module, the SIM 180 may provide support to use the provisioning profile 185 with a good communication environment. Herein, although the provisioning profile 185 with the good communication environment is selected, when provisioning fails, the SIM 180 may perform provisioning through the second communication module or may provide support to perform provisioning using another provisioning profile 185 according to control of the provisioning manager 170.

As described above, according to an embodiment of the present disclosure, the electronic device may include the SIM 180 for storing the at least one provisioning profile 185 and the provisioning manager 170 for collecting connection information of the server device when there is failure in provisioning through a first network with the server device which provides a profile to the SIM 180 and for controlling the provisioning through a second network based on the connection information.

According to an embodiment of the present disclosure, the provisioning manager 170 may activate the first communication module which may connect to the first network.

According to an embodiment of the present disclosure, the provisioning manager 170 may be configured to (or set to) determine communication states of the first network, which are associated with the plurality of provisioning profiles 185.

According to an embodiment of the present disclosure, the provisioning manager 170 may be configured to output each of the communication states of the first network, which corresponds to each of the provisioning profiles 185.

According to an embodiment of the present disclosure, when selection of an item of a provisioning profile with a specific communication state is received, the provisioning manager 170 may be configured to attempt to perform provisioning through the first network based on the selected provisioning profile.

According to an embodiment of the present disclosure, the provisioning manager 170 may be configured to automatically select a provisioning profile 185 indicating a communication state of a specific condition and to attempt to perform provisioning through the first network.

According to an embodiment of the present disclosure, the provisioning manager 170 may be configured to output a screen for selecting at least one communication module which may connect to the second network.

According to an embodiment of the present disclosure, when selection of a specific communication module is received, the provisioning manager may be configured to connect to the second network using the selected communication module.

According to an embodiment of the present disclosure, the provisioning manager may request the SIM 180 to establish the session with the server device which provides a profile based on the second network.

According to an embodiment of the present disclosure, the SIM 180 may establish the session based on a secure channel protocol (SCP81).

According to an embodiment of the present disclosure, the provisioning manager 170 may establish a Bluetooth communication channel with an interworking device which has interworking history and may request the interworking device to perform provisioning.

According to an embodiment of the present disclosure, the provisioning manager 170 may provide SIM related information and MAC address information of the Bluetooth communication channel to the interworking device.

According to an embodiment of the present disclosure, the provisioning manager 170 may provide support to establish a tunneling channel among the SIM 180, the interworking device, and the server device, which is necessary for transmitting the profile.

According to an embodiment of the present disclosure, the electronic device 100 may be a wearable device.

Figure 4:
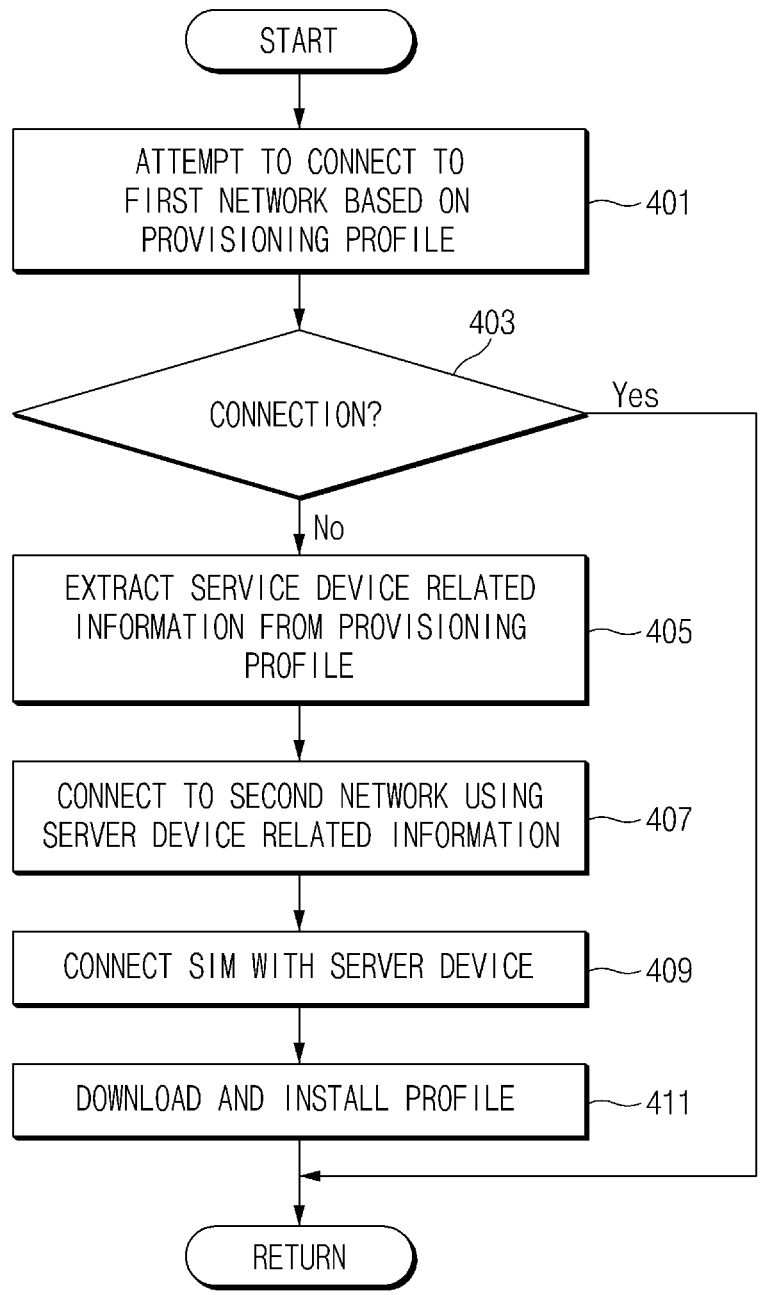
FIG. 4 is a flowchart of an electronic device operation method associated with processing a profile according to an embodiment of the present disclosure.

FIG. 4 is a flowchart of an electronic device operation method associated with processing a profile according to an embodiment of the present disclosure.

Referring to FIG. 4, in operation 401 of an electronic device operation method, a provisioning manager 170 of FIG. 1 may attempt to connect to a first network based on a provisioning profile 185 of FIG. 1. When a specific situation occurs, the provisioning manager 170 may activate a first communication module and may attempt to connect to the first network (e.g., a cellular network) based on the provisioning profile 185. The specific situation may include, for example, a situation when an electronic device 100 of FIG. 1 is changed from a turn-on state to a turn-off state, a situation when it is impossible to connect to a communication service based on a specific profile, or a situation when an event associated with a provisioning request occurs based on the specific provisioning profile 185, and the like.

In operation 403, the provisioning manager 170 may determine whether the connection to the first network is completed. When the connection to the first network is performed, the provisioning manager 170 may proceed to operation 409 and may provide support to download and install a profile of a SIM 180 of FIG. 1. When an electronic device 100 of FIG. 1 does not connect to the first network, in operation 405, the provisioning manager 170 may extract server device related information (e.g., an SRID, a server address, and the like, in other words, information associated with a device which connects to a network which may provide a profile) from the provisioning profile 185. Alternatively, the provisioning manager 170 may request the SIM 180 to transmit server device related information stored in the SIM 180 and may obtain the server device related information. If the server device related information is collected, the provisioning manager 170 may store the server device related information in a memory 130 of FIG. 1.

In operation 407, the provisioning manager 170 may connect to a second network using the server device related information. In this regard, the provisioning manager 170 may activate a second communication module. The second communication module may be a communication module which may connect to a communication network which is different from that of the first communication module. For example, the second communication module may include at least one of a Wi-Fi communication module, a Bluetooth communication module, or a wired communication module. The provisioning manager 170 may activate the specific second communication module. Alternatively, the provisioning manager 170 may provide various communication modules (e.g., a screen for selecting various communication modules, and the like), and may activate a specific communication module according to a selection of a user. If the second communication module is activated, the provisioning manager 170 may control an attempt to connect to the second network based on the server device related information.

If the electronic device 100 connects to (or establishes a communication channel with) the second network, in operation 409, the provisioning manager 170 may provide support to connect the SIM 180 with a server device through the second network. The connected network may be an IP network connected based on the Wi-Fi or Bluetooth communication module. The provisioning manager 170 may request the SIM 180 to establish a secure transport channel (e.g., an OTA session) with an SM-SR device 203 of FIG. 1. In operation 409, the provisioning manager 170 may request the SIM 180 to establish a secure transport channel according to the SCP81 standard (e.g. Transport Layer Security (TLS) based SCP), not the SCP 80 standard (e.g. European Telecommunication Standards Institute (ETSI) OTA SCP based on 102.226). The SIM 180 may transmit a request associated with establishing a corresponding session to the server device in response to the request of the provisioning manager 170 and may establish the corresponding session.

In operation 411, the provisioning manager 170 may provide support to download and install a profile through the communication channel (e.g., the OTA session) established between the SIM 180 and the server device. For example, the server device may collect a profile corresponding to the electronic device 100 in response to the request from the electronic device 100 and may provide the collected profile to the SIM 180 of the electronic device 100. In operation 411, in associated with the above-mentioned operation, the provisioning manager 170 may provide at least some (e.g., international mobile equipment identity (IMEI), an EID, an SRID, and the like) of information included in the provisioning profile 185 to an MNO device 201 of FIG. 1. The MNO device 201 may transmit the received information to the SM-DP device 202. The SM-DP device 202 may transmit the profile through the session established between the SM-SR device 203 and the SIM 180.

Figure 5:
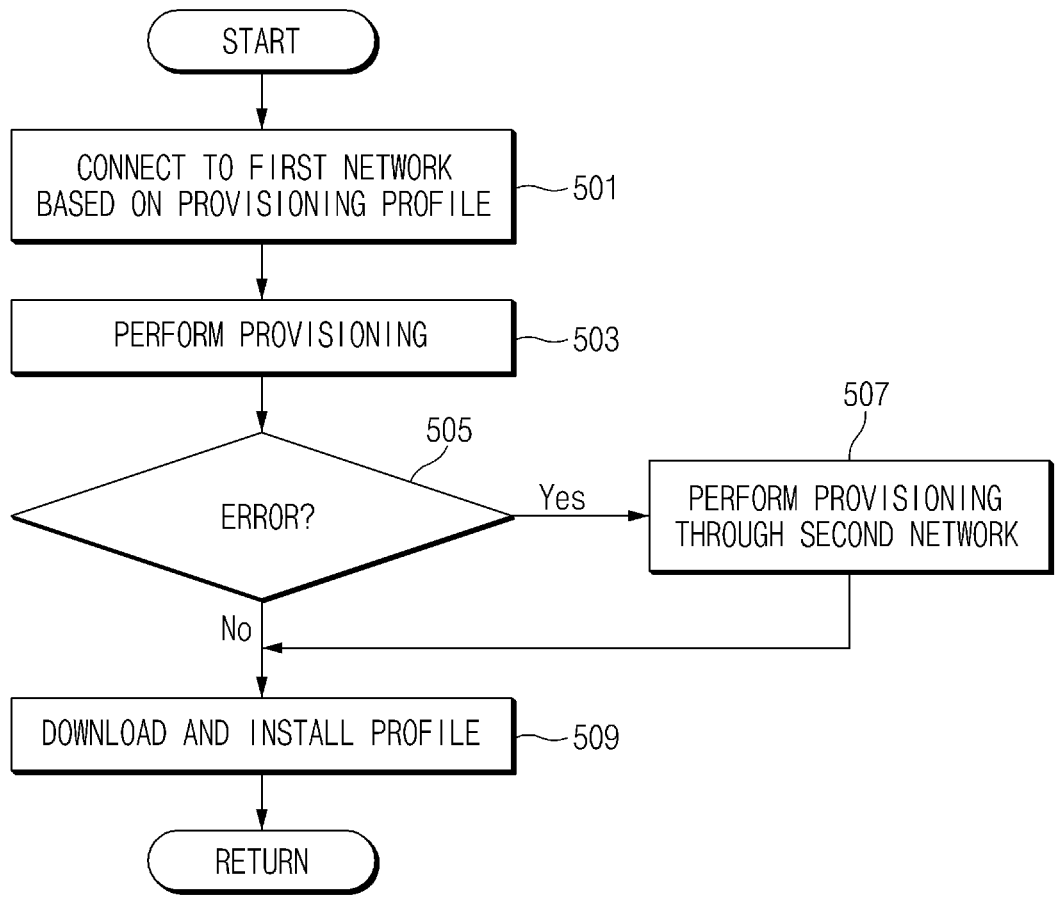
FIG. 5 is a flowchart of a method of processing an error of a provisioning profile according to an embodiment of the present disclosure.

FIG. 5 is a flowchart of a method of processing an error of a provisioning profile according to an embodiment of the present disclosure.

Referring to FIG. 5, in operation 501, in association with a method of processing an error of a provisioning profile, a provisioning manager 170 of FIG. 1 attempts to connect to a first network based on a provisioning profile 185 of FIG. 1. In this regard, the provisioning manager 170 may attempt to connect to an MNO device 201 of FIG. 1 through the first network (e.g., a cellular network) using information included in the provisioning profile 185 and a first communication module of FIG. 1.

In operation 503, the provisioning manager 170 performs provisioning. For example, the provisioning manager 170 may provide at least some of information of the provisioning profile 185 to the MNO device 201 to request registration. The MNO device 201 may receive some of the information of the provisioning profile 185, for example, device unique information, SIM identification information, server identification information, and the like. The MNO device 201 may provide the received information of the provisioning profile 185 to an SM-DP device 202 of FIG. 1 to request the SM-DP 202 to generate a profile. The SM-DP device 202 may generate the profile in response to the request for generating the profile. The SM-DP device 202 may request the SM-SR device 203 to establish a session with an electronic device 100 of FIG. 1 to transmit the generated profile. The SM-SR device 203 may request the electronic device 100 to establish a session associated with installing the profile using an SMS message and the like.

If the above-mentioned provisioning is performed, in operation 505, the provisioning manager 170 determines whether an error occurs. If the error occurs in operation 505 (e.g., if the error occurs in a parameter of the provisioning profile 185) in operation 507, the provisioning manager 170 controls execution of provisioning through a second network. When the error occurs in the parameter of the provisioning profile 185, the first network may be connected and registered, but a session for transmitting packet data may not be established. The provisioning manager 170 may reattempt to establish a session during a specific time or through attempts by a specific number of times. When provisioning fails in the attempts by a specific number of times, the provisioning manager 170 may control execution of provisioning based on the second network.

According to an embodiment of the present disclosure, the provisioning manager 170 may obtain address information of a server device from the provisioning profile 185 and may store the obtained address information in the memory 130. The provisioning manager 170 may request the server device to connect to the second network using a second communication module using the address information of the server device. For example, the provisioning manager 170 may control connection to the server device through Wi-Fi communication. The provisioning manager 170 may store the address information of the server device, which is obtained from the provisioning profile 185, in the memory 130. Also, the provisioning manager 170 may store network connection information (e.g., AP address information, an IP address, and the like) through a Wi-Fi communication module in the memory 130. The provisioning manager 170 may provide server device connection information through the second network, which is stored in the memory 130, to a SIM of FIG. 1. The SIM 180 may request the server device to establish a session through the second network and may establish the session associated with receiving a profile.

In FIG. 5, in operation 509, the provisioning manager 170 provides support to install a profile. According to an embodiment of the present disclosure, when the electronic device 100 connects to the server device through the first network, the provisioning manager 170 may receive an SMS message associated with establishing a session from the server device. The provisioning manager 170 may provide support to establish the session between the SIM 180 and the server device in response to the SMS message associated with establishing the session. According to another embodiment of the present disclosure, when the electronic device 100 connects to the server device through the second network, the provisioning manager 170 may support the establishment of the session between the SIM 180 and the server device in response to a request for establishing the session from the SIM 180. If the session is established, the server device may provide the profile to the SIM 180. The SIM 180 may generate an ISD-P associated with installing the received profile, and may download and install the corresponding profile (or an MNO profile).

Figure 6:
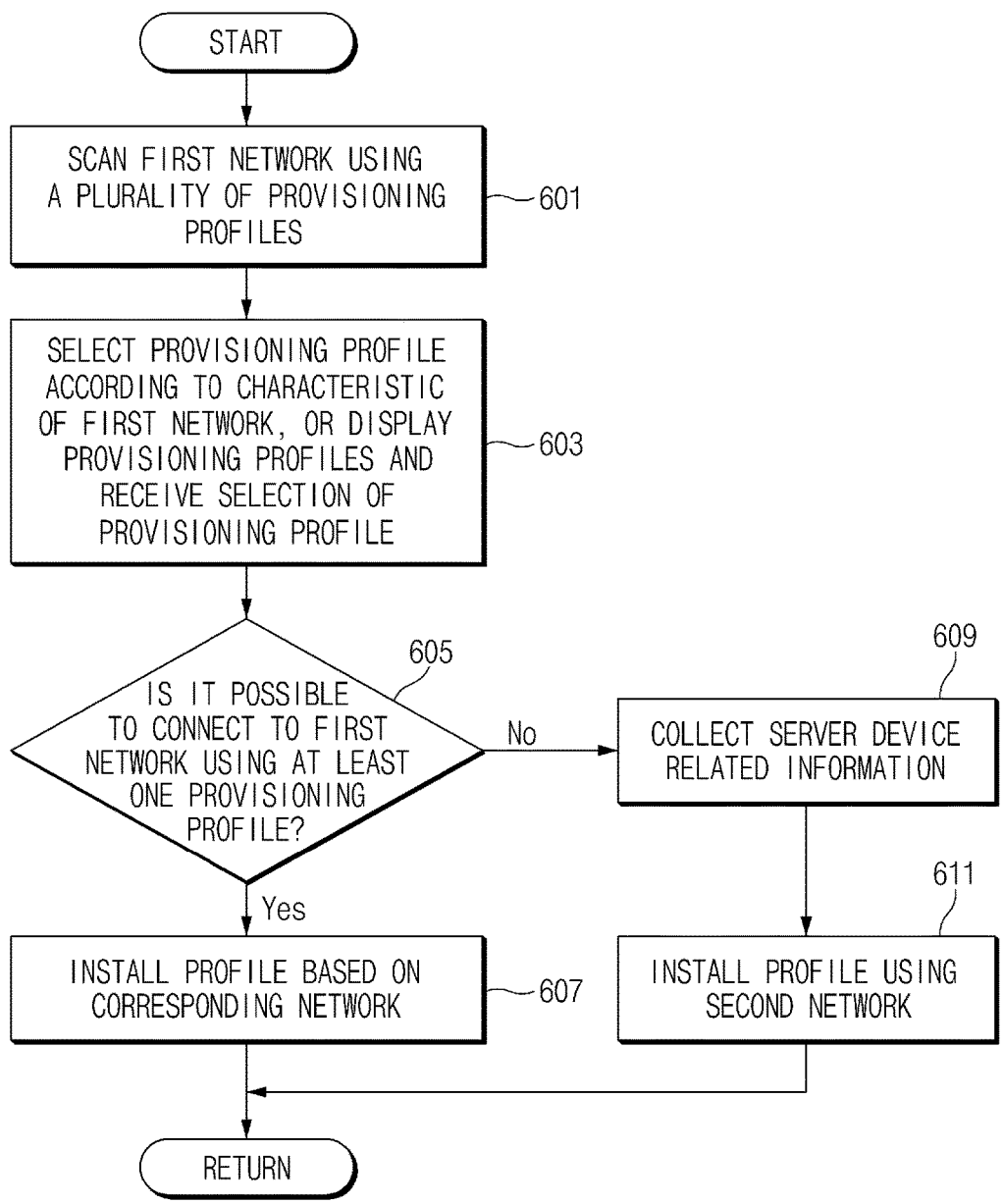
FIG. 6 is a flowchart of a provisioning method according to a communication environment according to an embodiment of the present disclosure.

FIG. 6 is a flowchart of a provisioning method according to a communication environment according to an embodiment of the present disclosure.

Referring to FIG. 6, in a provisioning method according to an embodiment of the present disclosure, in operation 601, a provisioning manager 170 of FIG. 1 controls a scan of a first network. For example, the provisioning manager 170 may search for at least one first network which is located in the vicinity of an electronic device 100 of FIG. 1 using a first communication module. In operation 603, the provisioning manager 170 selects a provisioning profile 185 according to a characteristic of the first network. For example, the provisioning manager 170 may select the provisioning profile 185 which may use a network with the best transmission speed or the best signal strength among the networks which are found using the first communication module. According to an embodiment of the present disclosure, the provisioning manager 170 may map state information of the plurality of found first networks with respective provisioning profiles 185 which may use the first networks, and may output the mapped information on a display 150 of FIG. 1. The provisioning manager 170 may receive input for selecting the specific provisioning profile 185 from a user.

In operation 605, the provisioning manager 170 determines whether it is possible to connect to the first network and performs provisioning using the at least one selected provisioning profile 185. When it is possible to connect to the first network and perform the provisioning, in operation 607, the provisioning manager 170 connects to the corresponding first network based on the provisioning profile 185 and may provide support to install a profile.

When it is impossible to connect to the first network or perform the provisioning, in operation 609, the provisioning manager 170 collects server device related information (e.g., server identification information and address information of an SM-SR device 203 of FIG. 1). In operation 611, the provisioning manager 170 controls the installation of a profile using the second network based on the collected information.

As described above, according to an embodiment of the present disclosure, the method of processing the provisioning profile may include attempting to perform provisioning through the first network with the server device which provides a profile, using at least one provisioning profile stored in the SIM, collecting connection information of the server device when the provisioning fails, and performing provisioning through the second network based on the connection information.

According to an embodiment of the present disclosure, attempting to perform the provisioning through the first network may include activating the first communication module which may connect to the first network.

According to an embodiment of the present disclosure, the method may further include determining communication states of the first network, which are associated with a plurality of provisioning profiles.

According to an embodiment of the present disclosure, the method may further include outputting each of communication states of the first network, which corresponds to each of the provisioning profiles.

According to an embodiment of the present disclosure, the method may further include receiving a selection of an item of a provisioning profile with a specific communication state and attempting to perform provisioning through the first network based on the selected provisioning profile.

According to an embodiment of the present disclosure, the method may further include automatically selecting a provisioning profile indicating a communication state of a specific condition and attempting to perform provisioning through the first network based on the selected provisioning profile.

According to an embodiment of the present disclosure, the method may further include outputting a screen for selecting at least one communication module which may connect to the second network.

According to an embodiment of the present disclosure, the method may further include receiving selection of a specific communication module and connecting to the second network using the selected communication module.

According to an embodiment of the present disclosure, the method may further include requesting the SIM to initialize session establishment with the server device which provides a profile based on the second network and establishing the session with the server device at the SIM.

According to an embodiment of the present disclosure, establishing the session may include establishing a session based on an SCP 81.

According to an embodiment of the present disclosure, attempting to perform the provisioning may include establishing a Bluetooth communication channel with an interworking device which has interworking history and requesting the interworking device to perform provisioning.

According to an embodiment of the present disclosure, requesting the provisioning may include providing the SIM related information and MAC address information of the Bluetooth communication channel to the interworking device.

According to an embodiment of the present disclosure, performing provisioning may include providing support to establish a tunneling channel among the SIM, the interworking device, and the server device, which is necessary for transmitting the profile.

According to an embodiment of the present disclosure, the electronic device may be a wearable device.

Figure 7A:
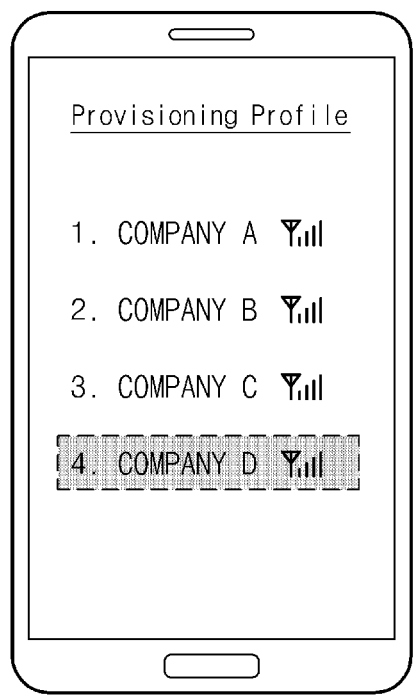
FIGS. 7A to 7C are illustrations of screens associated with processing a provisioning profile according to an embodiment of the present disclosure.
Figure 7B:
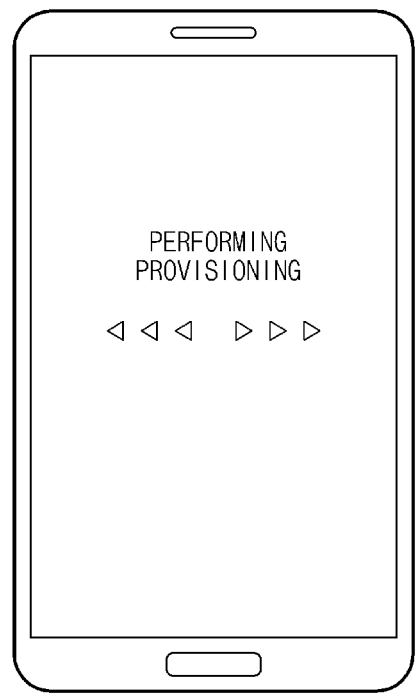
Figure 7C:
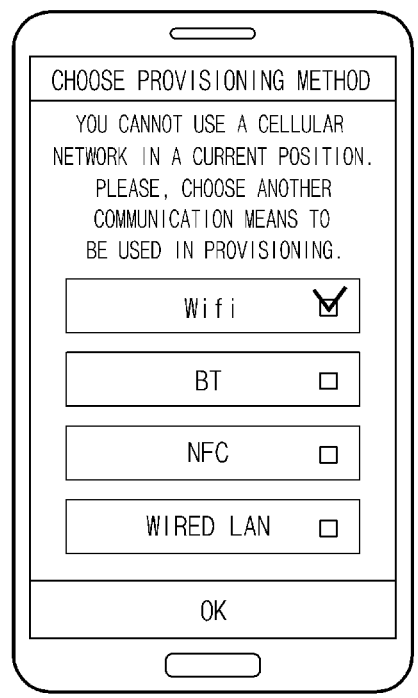

FIGS. 7A to 7C are illustrations of screens associated with processing a provisioning profile according to an embodiment of the present disclosure.

Referring to FIGS. 7A to 7C, according to an embodiment of the present disclosure, a provisioning manager 170 of an electronic device 100 of FIG. 1 may output a screen, such as a state screen 701, on a display 150 of FIG. 1 in response to an occurrence of a specific event. For example, if the electronic device 100 is changed from a turn-off state to a turn-on state, the provisioning manager 170 may determine at least one provisioning profile 185 of FIG. 1 which is stored in a SIM 180 of FIG. 1. According to an embodiment of the present disclosure, when a plurality of provisioning profiles 185 are stored in the SIM 180, the provisioning manager 170 may collect information about the provisioning profiles 185 through the SIM 180. The provisioning manager 170 may search for first networks associated with the provisioning profiles 185. For example, when four provisioning profiles 185 are stored in the SIM 180, as shown in FIG. 7A, the provisioning manager 170 may output items about the four provisioning profiles and information about network characteristics of the respective provisioning profiles 185. Associated with collecting the information about the network characteristics, the provisioning manager 170 may search for networks in the vicinity of the electronic device 100 using a first communication module and the respective provisioning profiles 185.

When a specific item, for example, a Company D item is selected among the displayed items associated with the provisioning profiles 185, the provisioning manager 170 may perform provisioning based on the corresponding provisioning profile 185. Accordingly, the display 150 may output a screen associated with performing the provisioning, such as a state screen 703 in FIG. 7B.

In the process of performing the provisioning, the provisioning may fail according to a specific situation. For example, there may be failure in an attempt to perform provisioning in an area where it is impossible to use a communication service, an attempt to perform provisioning in an area where there is no provisioning network, and an attempt to perform provisioning when an error occurs in a provisioning profile.

When the attempt to perform the provisioning fails, the provisioning manager 170 may output a screen associated with operating a second network, such as a state screen 705 in FIG. 7C. For example, the provisioning manager 170 may control the display 150 to output guide information about a state where it is impossible to use the first network (e.g., a cellular network) in a current position. Also, the provisioning manager 170 may output optional items, such as a Wi-Fi item, a Bluetooth (BT) item, a near field communication (NFC) item, and a wired local area network (LAN) item, according to kinds of communication modules to operate the second network. If a specific item is selected, the provisioning manager 170 may attempt to connect to the second network using a communication module corresponding to the selected item. The provisioning manager 170 may obtain address information of a server device from the selected provisioning profile 185 which is associated with the connection of the second network. According to an embodiment of the present disclosure, if a wired LAN card is inserted into the electronic device 100, the provisioning manager 170 may automatically display a check mark on the wired LAN item and may control a communication interface 160 of FIG. 1 to attempt to connect to the server device through a wired LAN.

As described above, the provisioning manager 170 according to an embodiment of the present disclosure may provide support to process provisioning in various environments, such as process provisioning when there is the plurality of provisioning profiles 185, process provisioning in an area where it is impossible to use a communication service, process provisioning in an area where there is no provisioning network, process provisioning when an error occurs in a provisioning profile, and the like.

For example, according to an embodiment of the present disclosure, the provisioning manager 170 may determine a state where the plurality of provisioning profiles 185 are installed in a process of determining whether the provisioning profile 185 exists in the SIM 180. Associated with the plurality of provisioning profiles 185, the provisioning manager 170 may select the specific provisioning profile 185 according to a specific condition ahead of the others and may perform provisioning based on the selected specific provisioning profile 185. For example, the provisioning manager 170 may search for networks which may connect in a current position and may determine at least one provisioning profile 185 which may be used in the current position among the plurality of provisioning profiles 185. The provisioning manager 170 may select the provisioning profile 185, which may be used in the current position, automatically, according to a specific condition, or according to input of a user. According to an embodiment of the present disclosure, when there is a plurality of networks which may connect in the current position and when there is a plurality of provisioning profiles 185 which may use the corresponding networks, the provisioning manager 170 may select the provisioning profile 185 which may use a network under a specific condition (e.g., a network with the strongest signal strength or a network with the fastest communication speed) among the networks which may be used in the current positions.

According to an embodiment of the present disclosure, when the execution of provisioning is attempted in a place where the electronic device 100 may not connect to a cellular network, such as a subway or a basement office, based on the electronic device 100 on which the SIM 180 (e.g., an embedded SIM (eSIM), an embedded universal integrated circuit card (eUICC), and the like) is mounted, which stores the provisioning profile 185, although the provisioning profile 185 is stored in the electronic device 100, it may be impossible to perform provisioning based on the cellular network. If it is determined that the electronic device 100 enters a "No service" state concerning the cellular network and is in a weak electromagnetic field with a signal level of a specific value or less, the provisioning manager 170 may provide support to process provisioning through a IP network automatically or manually. In this regard, the provisioning manager 170 may request a connection to a local-area communication network. When the connection to the network succeeds, the provisioning manager 170 may provide support to connect to a server device, establish an OTA session through the IP network, and download and install a profile. According to an embodiment of the present disclosure, when there is no device which may connect to a Wi-Fi access point (AP) or BT in the vicinity of the electronic device 100, the provisioning manager 170 may output information about requesting connection to a wired network. When the electronic device 100 connects to a desktop PC or a notebook PC, to which a wired LAN connects, by wire, the provisioning manager 170 may connect to the server device through the wired network and may process provisioning.

According to an embodiment of the present disclosure, if all MNOs around the specific electronic device 100 are not contracted to companies which provide the plurality of provisioning profiles 185 included in the corresponding electronic device 100, there may be no network which may connect to the provisioning profiles 185 of the electronic device 100. In this case, the provisioning manager 170 may determine networks which may connect in the current positions and may output information about the provisioning profile 185 which may connect to the network in the corresponding position among the plurality of provision profiles 185. Alternatively, the provisioning manager 170 may omit separate information output and may attempt to perform provisioning using the corresponding provisioning profile 185. When it is impossible to connect to the network using all the provisioning profiles 185 stored in the SIM 180, the provisioning manager 170 may connect to the server device through Wi-Fi communication, BT communication, wired connection, and the like automatically or manually, and may perform provisioning.

As described above, according to an of the present disclosure, in the state where it is impossible to connect to the network through the provisioning profile 185 associated with processing provisioning, the electronic device 100 which stores the provisioning profile 185 may provide support to connect to the server device and download and install the profile.

Figure 8:
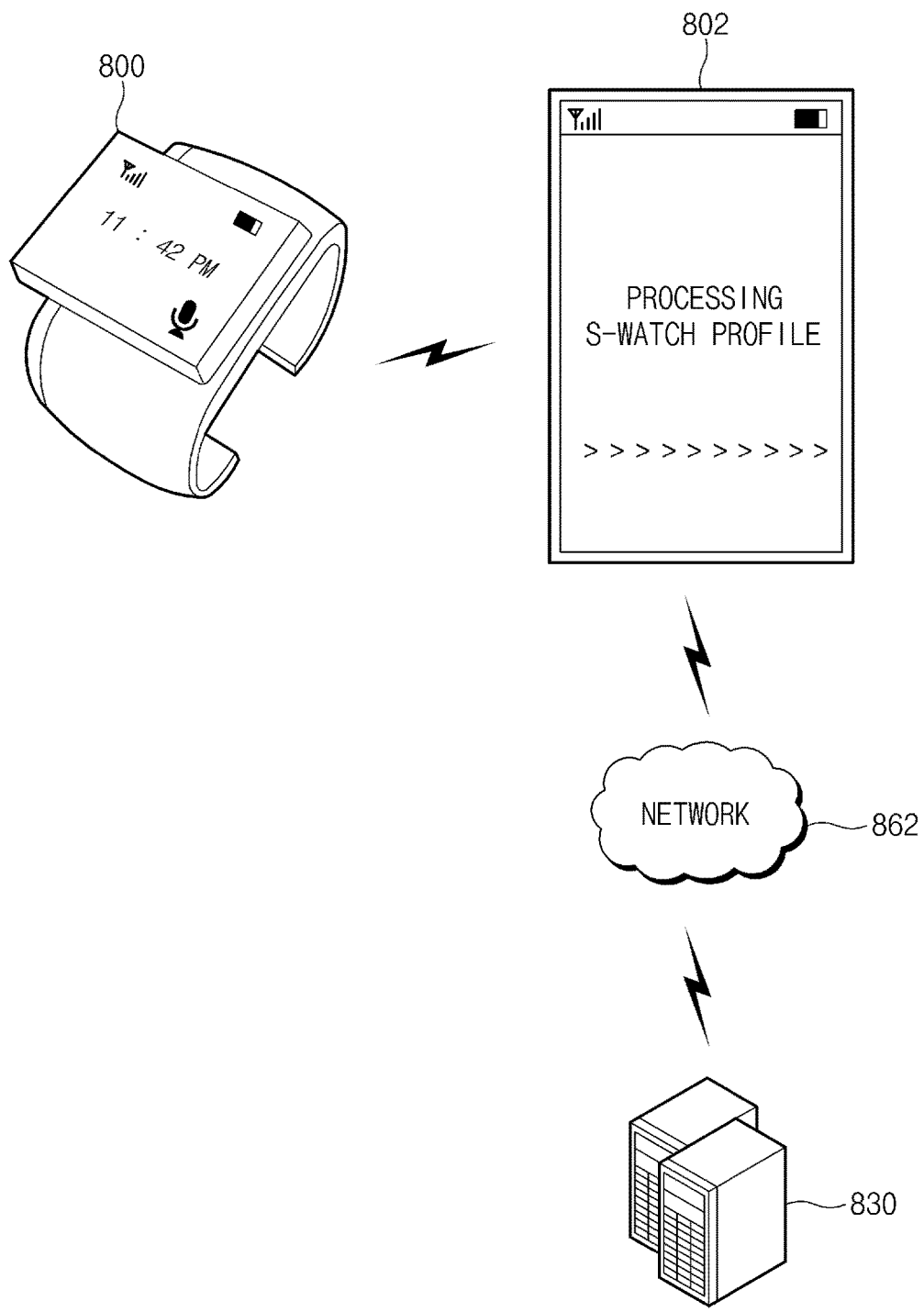
FIG. 8 is a block diagram of an operation environment of a wearable device associated with processing a provisioning profile according to an embodiment of the present disclosure.

FIG. 8 is a block diagram of an operation environment of a wearable device associated with processing a provisioning profile according to an embodiment of the present disclosure.

Referring to FIG. 8, an operation environment of a wearable device associated with processing a provisioning profile may include, for example, a wearable device 800 (e.g., an electronic device 100 of FIG. 1), an interworking device 802 (e.g., an external electronic device 102 of FIG. 1), a network 862 (e.g., a network 162 of FIG. 1), and a server device 830 (at least one of an MNO device 201, an SM-DP device 202, or an SM-SR device 203).

The wearable device 800 may include a device which may be installed, mounted, or carried on a specific location of a user. For example, the wearable device 800 may be at least one of various devices such as a smart watch, a smart necklace, a smart glass, and a smart ring. FIG. 8 illustrates a smart watch as an example. The wearable device 800 may include a first communication module associated with using a communication service based on a cellular network and a second communication module for supporting a local-area communication function. Also, the wearable device 800 may include a SIM. The SIM may be provided in a state where a profile is not installed therein. The SIM may store a provisioning profile.

According to an embodiment of the present disclosure, if the wearable device 800 is changed from a turn-off state to a turn-on state, it may determine whether there is a provisioning profile. If there is a provisioning profile, the wearable device 800 may connect to the server device 830 using the provisioning profile. In this process, when it is impossible to connect to the server device 830 directly, the wearable device 800 may receive a profile from the server 830 through the interworking device 802. In this regard, the wearable device 800 may be in a state where it is possible to establish a communication channel with the interworking device 802 based on the second communication module or where a communication channel is established. For example, the wearable device 800 may establish at least one of a Wi-Fi direct communication channel or a BT communication channel with the interworking device 802 according to a kind of the second communication module. The wearable device 800 may provide SIM related information (e.g., an eUICC identifier (ID) (EID) and a spatial reference system ID (SRID)) which is stored in the provisioning profile to the interworking device 802.

According to an embodiment of the present disclosure, the wearable device 800 may transmit an IP address, a service set identifier (SSID), an ID, a password, and the like of an AP associated with the Wi-Fi direct communication channel together to the interworking device 802. According to an embodiment of the present disclosure, the wearable device 800 may transmit a media access control (MAC) address associated with a BT communication module, information about history in which it previously connected to an external electronic device, and the like to the interworking device 802.

The interworking device 802 may connect to the network 862 using the profile installed in the SIM and may connect to the server device 830. The interworking device 802 may transmit the SIM related information provided by the wearable device 800 to the server device 830. The server device 830 may provide a profile corresponding to the SIM related information provided by the wearable device 800 to the wearable device 800. In this regard, the server device 830 may generate a profile based on the SIM related information provided by the wearable device 800 or may provide a previously generated profile to the wearable device 800. When providing the previously generated profile, the server device 830 may perform a procedure for applying the SIM related information of the wearable device 800 to a specific region of a profile.

The above-mentioned server device 830 may be, for example, an SM-SR device which provides a profile or the specific MNO device 201. If the SIM related information of the wearable device 800 is received from the interworking device 802, the MNO device 201 may provide the SIM related information to the SM-DP device 202, and may request the SM-SR device 203 to provide a previously generated profile to the interworking device 802 through the SM-SR device 203 or may request the SM-SR device 203 to generate a profile corresponding to the SIM related information and transmit the generated profile to the interworking device 802 through the SM-SR device 203.

If the profile is received from the server device 830, the interworking device 802 may transmit the profile to the wearable device 800 through a local-area communication channel established with the wearable device 800. In this process, the wearable device 800 may install the profile in the SIM.

According to an embodiment of the present disclosure, the interworking device 802 may provide the SIM related information and communication channel related information (e.g., information associated with a Wi-Fi direct communication channel or information associated with a BT communication channel) with the wearable device 800 to the server device 830. The SM-SR device 203 which transmits the profile may establish tunneling between, for example, the wearable device 800 and the interworking device 802, and between the network 862 and the SM-DP device 202. The SM-SR device 203 may provide support to transmit a profile of the SM-DP device 202 to the wearable device 800.

According to an embodiment of the present disclosure, the electronic device may process the provisioning profile to be suitable for the network environment of the electronic device and may provide support to download and install the profile.

The term "module" used in an embodiment of the present disclosure may refer to, for example, a unit including one of hardware, software, and firmware or a combination of two or more thereof. The term "module" may be interchangeably used with, for example, the terms "unit," "logic," "logical block," "component," "circuit," and the like. The term "module" may refer to a minimum unit of an integrated component or a part thereof. The term "module" may refer to a minimum unit performing one or more functions or a part thereof.

According to an embodiment of the present disclosure, at least a part of a device (e.g., modules or the functions) or a method (e.g., operations) may be implemented with instructions stored in a non-transitory computer-readable storage media which has, for example, a programming module. When the instructions are executed by one or more processors, the one or more processors may perform functions corresponding to the instructions.

The non-transitory computer-readable storage media may include magnetic media such as a hard disc, a floppy disk, and a magnetic tape, optical media such as a compact disc read only memory (CD-ROM) and a digital versatile disc (DVD), magneto-optical media such as a floptical disk, and hardware configured to store and execute program instructions (e.g., program modules), such as a ROM, a random access memory (RAM) and a flash memory. Also, the program instructions may include not only machine code generated by a compiler but also high-level language code which may be executed by a computer using an interpreter and the like. The above-mentioned hardware may be configured to operate as one or more software modules to perform operations according to an embodiment of the present disclosure, and vice versa.

According to an embodiment of the present disclosure, in the non-transitory computer-readable storage media which store instructions, the instructions may be configured to allow at least one processor to execute at least one operation when they are executed by the at least one processor. The at least one instruction may be configured to attempt to perform provisioning through a first network with a server device which provides a profile using at least one provisioning profile stored in a SIM, to collect connection information of the server device when the provisioning fails, and to perform provisioning through a second network based on the connection information.

Embodiments of the present disclosure described and shown in the accompanying drawings are provided as examples to describe technical content and help understanding but do not limit the scope of the present disclosure. Accordingly, it should be interpreted that besides the embodiments of the present disclosure listed herein, all modifications or modified forms derived based on the technical ideas of the present disclosure are included in the scope of the present disclosure, as defined by the appended claims, and their equivalents.

What is claimed is:
1. An electronic device, comprising:
   a subscriber identification module (SIM) configured to store a plurality of provisioning profiles, wherein each of the provisioning profiles include information for receiving a profile; and
   a processor configured to control operation of the SIM, and connect to a server device which provides the profile through a first network using a specific provisioning profile among the plurality of provisioning profiles, collect server device related information from the specific provisioning profile when the electronic device does not connect to the server device through the first network, and connect to the server device based on the collected server device related information for obtaining the profile through a second network, wherein the server device related information includes at least one of a server address of the server device and information associated with a network which provides a profile, wherein the profile is associated with operating a communication service of a certain mobile network operator to establish a communication channel to be suitable for a network environment of an electronic device.

2. The electronic device of claim 1, wherein the processor is further configured to activate a first communication module, which establishes a communication channel with the first network associated with performing the provisioning through the first network.

3. The electronic device of claim 1, wherein the processor is further configured to determine communication states of the first network, which are associated with the plurality of provisioning profiles.

4. The electronic device of claim 3, wherein the processor is further configured to output each of the communication states of the first network, which corresponds to each of the plurality of provisioning profiles.

5. The electronic device of claim 4, wherein if a provisioning profile is selected with a specific communication state associated with connecting to the first network is received, the processor is further configured to attempt to perform provisioning through the first network based on the selected provisioning profile.

6. The electronic device of claim 3, wherein the processor is further configured to automatically select a provisioning profile corresponding to a communication state of the first network among the plurality of provisioning profiles and to attempt to perform provisioning through the first network based on the selected provisioning profile.

7. The electronic device of claim 1, wherein the processor is further configured to output a screen for selecting at least one communication module which establishes a communication channel with the second network.

8. The electronic device of claim 7, wherein if a selection of a specific communication module associated with connecting to the second network is received, the processor is further configured to connect to the second network using the selected communication module.

9. The electronic device of claim 1, wherein the processor is further configured to request the SIM to establish a session with a server device which provides a profile based on the second network.

10. The electronic device of claim 9, wherein the SIM is further configured to establish the session based on a secure channel protocol 81 (SCP81).

11. The electronic device of claim 1, wherein the processor is further configured to establish a Bluetooth communication channel with an interworking device which has interworking history and request the interworking device to perform provisioning.

12. The electronic device of claim 11, wherein the processor is further configured to provide information associated with the SIM and media access control (MAC) address information of the Bluetooth communication channel to the interworking device.

13. The electronic device of claim 11, wherein the processor is further configured to provide support to establish a tunneling channel among the SIM, the interworking device, and the server device, for transmitting the profile.

14. The electronic device of claim 9, wherein the SIM is installed in a wearable device.

15. A method of processing a provisioning profile in an electronic device, comprising:

connecting to a server device which provides the profile through a first network using a specific provisioning profile among a plurality of provisioning profiles stored in a subscriber identification module (SIM), collecting server device related information from the specific provisioning profile when the electronic device does not connect to the server device through the first network, and connecting to the server device based on the collected server device related information for obtaining the profile through a second network, wherein the server device related information includes at least one of a server address of the server device and information associated with a network which provides a profile, wherein the profile is associated with operating a communication service of a certain mobile network operator to establish a communication channel to be suitable for a network environment of an electronic device.

16. The method of claim 15, wherein connecting to the server device which provides the profile through a first network comprises:

activating a first communication module which establishes a communication channel with the first network; and after determining communication states of the first network, which are associated with the plurality of provisioning profiles and outputting each of the communication states of the first network, which corresponds to each of the provisioning profiles, if selection of an item of a provisioning profile with a specific communication state is received, attempting to perform provisioning through the first network based on the selected provisioning profile, or automatically selecting a provisioning profile corresponding to a communication state of the first network among the plurality of provisioning profiles and attempting to perform provisioning through the first network based on the selected provisioning profile.

17. The method of claim 15, further comprising:

outputting a screen for selecting at least one communication module which establishes a communication channel with the second network and if selection of a specific communication module associated with connecting to the second network is received, connecting to the second network using the selected communication module, or requesting the SIM to initialize session establishment with the server device which provides a profile based on the second network and establishing a session with the server device at the SIM.

18. The method of claim 17, wherein session establishing comprises:

session establishment based on a secure channel protocol 81 (SCP81).

19. The method of claim 15, wherein connecting to the server device which provides the profile through a first network comprises:
- establishing a Bluetooth communication channel with an interworking device which has interworking history and requesting the interworking device to perform provisioning;
- providing information associated with the SIM and media access control (MAC) address information of the Bluetooth communication channel to the interworking device; and
- providing support to establish a tunneling channel among the SIM, the interworking device, and the server device, for transmitting the profile.

20. The method of claim 15, wherein the electronic device is a wearable device.

21. A chipset for processing a provisioning profile in an electronic device that is configured to:
- connect to a server device which provides the profile through a first network using a specific provisioning profile among a plurality of provisioning profiles stored in a subscriber identification module (SIM),
- collect server device related information from the specific provisioning profile when the electronic device does not connect to the server device through the first network, and
- connect to the server device based on the collected server device information for obtaining the profile through a second network,
- wherein the server device related information includes at least one of a server address of the server device and information associated with a network which provides a profile,
- wherein the profile is associated with operating a communication service of a certain mobile network operator to establish a communication channel to be suitable for a network environment of an electronic device.

22. The electronic device of claim 1, wherein the processor is further configured to connect to a server device which provides the profile through a first network by:
- scanning the first network using the plurality of provisioning profiles;
- selecting one of the plurality of provisioning profiles according to a characteristic of the first network or displaying the plurality of provisioning profiles and receive a selection of one of the plurality of provisioning profiles;
- determining if it is possible to connect to the first network using the selected at least one of the plurality of provisioning profiles;
- if it is possible to connect to the first network, installing a profile based on the first network; and
- if it is not possible to connect to the first network, collecting server device related information and install a profile using the second network.

\* \* \* \* \*